US010261984B2

(12) United States Patent
Sarangapani et al.

(10) Patent No.: US 10,261,984 B2
(45) Date of Patent: Apr. 16, 2019

(54) BROWSER AND OPERATING SYSTEM COMPATIBILITY

(71) Applicant: Accenture Global Services Limited, Dublin (IE)

(72) Inventors: Rajesh Sarangapani, Hyderabad (IN); Kasi Vishwanath, Bangalore (IN); Prem Sagar, Hyderabad (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 578 days.

(21) Appl. No.: 14/691,377

(22) Filed: Apr. 20, 2015

(65) Prior Publication Data

US 2015/0227498 A1 Aug. 13, 2015

Related U.S. Application Data

(63) Continuation of application No. 13/460,195, filed on Apr. 30, 2012, now Pat. No. 9,037,965.

(30) Foreign Application Priority Data

Feb. 13, 2012 (IN) .............................. 515/CHE/2012

(51) Int. Cl.
*G06F 17/00* (2019.01)
*G06F 17/22* (2006.01)
(Continued)

(52) U.S. Cl.
CPC ...... *G06F 17/2247* (2013.01); *G06F 11/3608* (2013.01); *G06F 11/368* (2013.01); (Continued)

(58) Field of Classification Search
CPC ........... G06F 17/2211; G06F 17/30861; G06F 17/2247; G06F 11/3608; G06F 11/3616
See application file for complete search history.

(56) References Cited

U.S. PATENT DOCUMENTS

| 8,381,094 | B1 * | 2/2013 | Prasad .............. G06F 17/30861 |
| | | | 709/203 |
| 2009/0100345 | A1 | 4/2009 | Miller |

(Continued)

OTHER PUBLICATIONS

Choudhary, Shauvik Roy, et al., "WEBDIFF: Automated Identification of Cross-browser Issues in Web Applications", Georgia Institute of Technology, Sep. 12, 2010; pp. 1-9; ISBN: 978-1-4244-8630-4.

(Continued)

*Primary Examiner* — Stephen S Hong
*Assistant Examiner* — Marshon L Robinson
(74) *Attorney, Agent, or Firm* — Mannava & Kang, P.C.

(57) ABSTRACT

A browser and operating system (OS) compatibility system may include a user interface to select a first combination of a browser and OS for comparison to a second combination of a browser and OS. A download engine may capture source files for browsers for the first and second combinations. A parse engine may create Document Object Model (DOM) trees of objects of first and second website pages respectively for the browsers for the first and second combinations. A metric engine may read the DOM trees for attributes of the objects to capture metrics of the objects. An analysis metric engine may compare a metric of an object of the first website page to a metric of the same object of the second website page to determine a compatibility of the browser and the OS for the first combination to the browser and the OS for the second combination.

20 Claims, 10 Drawing Sheets

(51) Int. Cl.
*G06F 11/36* (2006.01)
*G06F 17/30* (2006.01)
*H04L 29/08* (2006.01)

(52) U.S. Cl.
CPC .... *G06F 11/3616* (2013.01); *G06F 17/30106* (2013.01); *G06F 17/30896* (2013.01); *H04L 67/02* (2013.01)

(56) References Cited

U.S. PATENT DOCUMENTS

| | | | | |
|---|---|---|---|---|
| 2013/0080930 | A1* | 3/2013 | Johansson | G06F 9/46 715/760 |
| 2014/0020053 | A1* | 1/2014 | Kay | G06F 21/121 726/1 |
| 2015/0205882 | A1* | 7/2015 | Vukas | G06F 17/30899 707/758 |

OTHER PUBLICATIONS

Mesbah, Ali, et al., "Automated cross-browser compatibility testing" ICSE, 2011 33rd International Conference ON, May 21, 2011; pp. 561-570; ISBN: 978-1-4503-0445-0.
European Search Report for EP Application No. 13000743.8-1954, dated Jul. 2, 2013.
Shah S: "Crawling Ajax-driven Web 2.0 Applications", Internet Citation, Feb. 14, 2007, 9 pages.
Mesbah A et al: "Crawling AJAX by Inferring User Interface State Changes", Web Engineering, 2008. ICWE '08. Eighth International Conference on, IEEE, Piscataway, NJ, USA, Jul. 14, 2008, pp. 122-134.

* cited by examiner

| URL | Operating System | Browser | Object Name | X Position | Y Position | Width | Height |
|---|---|---|---|---|---|---|---|
| http://www.url.com | Windows 7 | IE | HeaderContainer | 0 | 0 | 98 | 48 |
| http://www.url.com | Windows XP | Chrome | HeaderContainer | 9 | 0 | 98 | 48 |
| http://www.url.com | Windows 7 | Firefox | HeaderContainer | 10 | 0 | 98 | 48 |
| http://www.url.com | Windows XP | IE 6 | HeaderContainer | 9 | 12 | 98 | 39 |
| http://www.url.com | Windows XP | IE7 | HeaderContainer | 9 | 0 | 98 | 48 |
| http://www.url.com | Windows 7 | IE | logo | 102 | 10 | 109 | 28 |
| http://www.url.com | Windows XP | Chrome | logo | 107 | 10 | 109 | 25 |
| http://www.url.com | Windows 7 | Firefox | logo | 104 | 10 | 109 | 25 |
| http://www.url.com | Windows XP | IE 6 | logo | 103 | 22 | 109 | 28 |
| http://www.url.com | Windows XP | IE7 | logo | 105 | 10 | 109 | 28 |

BROWSER AND OPERATING SYSTEM COMPATIBILITY

PRIORITY

This application is a continuation of commonly assigned and co-pending U.S. patent application Ser. No. 13/460,195, filed Apr. 30, 2012, entitled "BROWSER AND OPERATING SYSTEM COMPATIBILITY", which claims priority to Indian Application Serial Number 515/CHE/2012, filed Feb. 13, 2012, entitled "BROWSER AND OPERATING SYSTEM COMPATIBILITY." Both of these applications are incorporated by reference in their entireties.

BACKGROUND

A web application may include applications that are accessed over a network, such as, for example, the internet or an intranet. Web applications may also include computer software applications that are coded in a browser-supported language, such as, for example, JavaScript, combined with a browser-rendered markup language, such as, for example, HyperText Markup Language (HTML). Web applications may rely on a web browser to render the application executable. Examples of web applications may include webmail, online retail sales, online auctions and other functions.

For a web application, an end user may browse web sites according to their available or preferred operating system (OS) and browser combination. Examples of operating systems may include WINDOWS XP and MAC 10.6, and various versions thereof. Examples of browsers may include INTERNET EXPLORER, FIREFOX, SAFARI and GOOGLE CHROME, and various versions thereof.

In order to meet user requirements, applications and web sites may need to undergo browser and OS compatibility testing. For example, an application may include static and dynamic objects that may display and operate differently from a base browser and OS combination for which the application is designed for, compared to other browser and OS combinations that may be chosen by a user for operating the application. Objects may include, for example, graphics, text, drop down menus etc., and generally, any component of a website page. Browser and OS compatibility testing may thus determine compatibility of a public facing web application with a particular OS and browser combination. Browser and OS compatibility testing may also account for which browser and OS combination is critical to support, and how an application may be evolved for supporting new OS and browser versions, as well as older OS and browser versions.

Browser and OS compatibility testing may be performed by visually comparing a screen-shot of an application on a base browser and OS combination with other browser and OS combinations. However, such compatibility testing techniques are impractical due to the number of available applications, and browser and OS combinations. Such compatibility testing techniques are also inaccurate, and are further impractical due to their limitations in accounting for changes in applications, as well as changes in operating systems and browsers.

BRIEF DESCRIPTION OF DRAWINGS

The embodiments are described with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

A browser and OS compatibility system may include a user interface to select a first combination of a browser and an OS for comparison to a second combination of a browser and an OS. The browser and/or the OS for the first combination may be different from the browser and/or the OS for the second combination. A download engine may capture source files for the browsers for the first and second combinations. A parse engine may create Document Object Model (DOM) trees of objects of first and second website pages respectively for the browsers for the first and second combinations. The website pages may be for the same uniform resource locator. A metric engine may read the DOM trees for attributes of the objects to capture metrics of the objects of the first and second website pages. An analysis metric engine may compare a metric of an object of the first website page to a metric of the same object of the second website page to determine a compatibility of the browser and the OS for the first combination to the browser and the OS for the second combination.

For the browser and OS compatibility system described above, the user interface may include a base lining option to permit a user to choose single first and second browsers and a multi instance option to permit the user to select multiple first and second browsers. The metrics of the objects may include an absolute location and/or a size of an object of a website page. The source files may be HTML source files. The browser and OS compatibility system may further include a HTML cleaner engine to remove parser invalid characters from the source files. The system may further include a style engine to invoke dynamic objects for adding HTML source data related to the dynamic objects to a respective DOM tree. The style engine may invoke a maximum number of the dynamic objects with similar characteristics to maximize efficiency of the browser and OS compatibility system. The system may further include a report generation engine to generate a compatibility report for the objects of first and second website pages. The compatibility report may include an indication of a deviation of the metric of the object of the first website page from the metric of the same object of the second website page. The indication may be based on the deviation exceeding a predetermined threshold or a user-defined threshold.

As described in detail below, a method for browser and OS compatibility testing may include selecting a first combination of a browser and an OS for comparison to a second combination of a browser and an OS. The browser and/or the OS for the first combination may be different from the browser and/or the OS for the second combination. The method may further include capturing source files for the browsers for the first and second combinations, and creating DOM trees of objects of first and second website pages respectively for the browsers for the first and second combinations. The website pages may be for the same uniform resource locator. The method may further include reading the DOM trees for attributes of the objects to capture metrics of the objects of the first and second website pages. The method may also include comparing a metric of an object of the first website page to a metric of the same object of the second website page to determine a compatibility of the browser and the OS for the first combination to the browser and the OS for the second combination.

For the method described above, the metrics of the objects may include an absolute location and/or size of an object of a website page. The method may further include invoking dynamic objects for adding HTML source data related to the dynamic objects to a respective DOM tree. The method may include invoking a maximum number of the dynamic objects with similar characteristics to maximize efficiency of the browser and OS compatibility testing. The method may include generating a compatibility report for the objects of first and second website pages. The compatibility report may include an indication of a deviation of the metric of the object of the first website page from the metric of the same object of the second website page. The indication may be based on the deviation exceeding a predetermined threshold.

As described in detail below, a non-transitory computer readable medium may have stored thereon a computer executable program for browser and OS compatibility testing. The computer executable program, when executed, may cause a computer system to select a first combination of a browser and an OS for comparison to a second combination of a browser and an OS. The browser and/or the OS for the first combination may be different from the browser and/or the OS for the second combination. The computer executable program, when executed, may further cause the computer system to capture source files for the browsers for the first and second combinations, and create DOM trees of objects of first and second website pages respectively for the browsers for the first and second combinations. The website pages may be for the same uniform resource locator. The computer executable program, when executed, may further cause the computer system to read the DOM trees for attributes of the objects to capture metrics of the objects of the first and second website pages. The computer executable program, when executed, may further cause the computer system to compare a metric of an object of the first website page to a metric of the same object of the second website page to determine a compatibility of the browser and the OS for the first combination to the browser and the OS for the second combination.

The browser and OS compatibility system may thus provide an automated framework for browser and OS compatibility testing for various browser and OS combinations with minimum effort. The system may provide a user with an option, for example, for performing testing in a single pass for different browsers installed on a user's local machine. A user may use this option, for example, for base line browser results if the base browser identified is on a local machine. Alternatively, the system may provide a user with an option for testing an application for all browser and OS combinations. The system may implement the browser and OS compatibility testing, for example, by obtaining the alignments (i.e., DOM) of the objects of the website pages for the base browser selected by the user and generate results accordingly. The DOM is a cross-platform and language-independent convention for representing and interacting with objects, for example, in HTML, eXtensible HyperText Markup Language (XHTML) and Extensible Markup Language (XML) documents. The system may compare the results of other browsers against the base browser results and generate, for example, a new report marking the discrepancies (i.e., deviations) in the alignments across browsers.

The browser and OS compatibility testing capability of the system also functions as a look and feel test across various browser and OS combinations. For example, the browser and OS compatibility testing capability functions as a look and feel test for a website page including static and/or dynamic objects, for example, by mimicking end user actions that would navigate a website. The testing capability of the system also provides the ability to measure pixel perfectness precisely across browser and OS combinations. The testing capability of the system also provides a measure for web site "go-live" readiness. The system also provides for the ability to concurrently validate and compare compatibility metrics (i.e., look and feel aspects) in parallel. The go-live readiness of a web site may be compared with a checklist, including, for example, "SEO meta tag completeness", "URL redirect rules completeness", "personalization code completeness", and "site quality against local anchor links". The SEO meta tags may be used to optimize a search by defining meta tags (keywords, description) on each website page. The comparator module (described below) may compare the meta tags on a website page with the expected meta tag (input), and the results may be published as web site readiness. The uniform resource locator (URL) redirect rules completeness may ensure that old URLs are redirected to new URLs. The DOM analysis module (described below) may parse a new URL, and as described below, a go-live readiness report may be published in conjunction with the comparator module. For personalization code completeness, the DOM analysis module may parse each web page to verify if a personalization code is present in each web page. With regard to site quality against local anchor links, every website page may be analyzed by the DOM analysis module and the scan module to find broken local anchor links, which may be reported in a go-live readiness report.

Figure 1A:
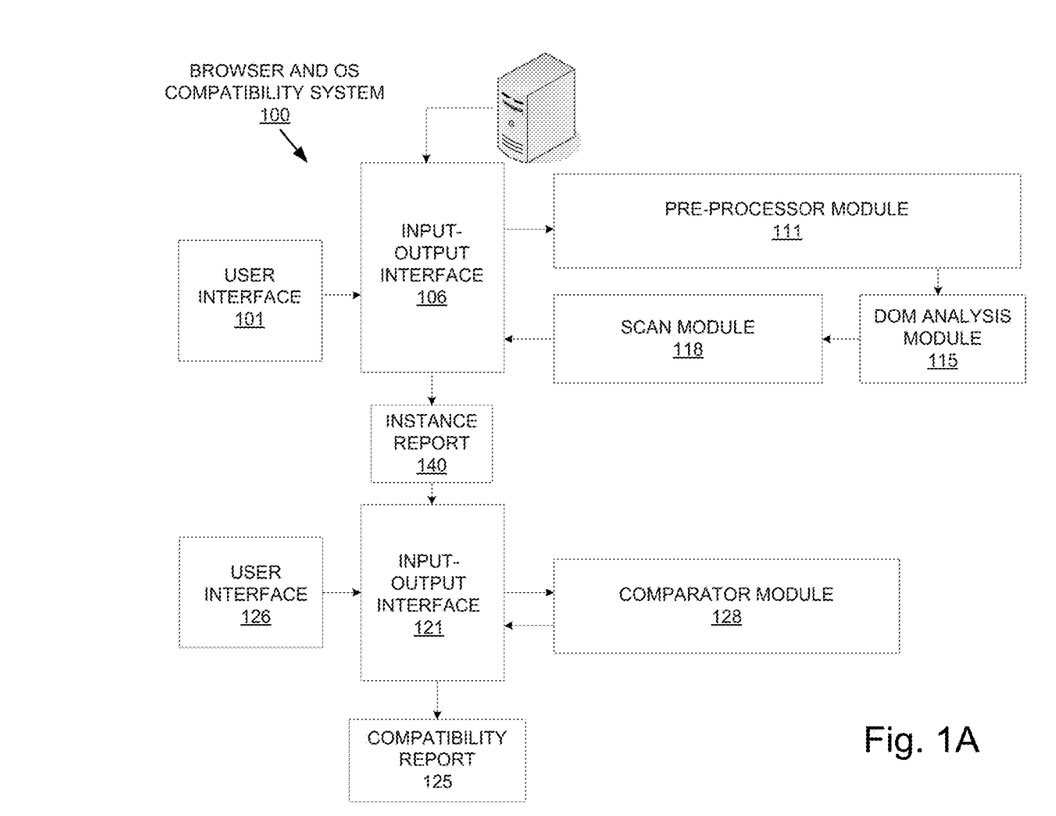
FIG. 1A illustrates a system diagram for a browser and OS compatibility system.
Figure 1B:
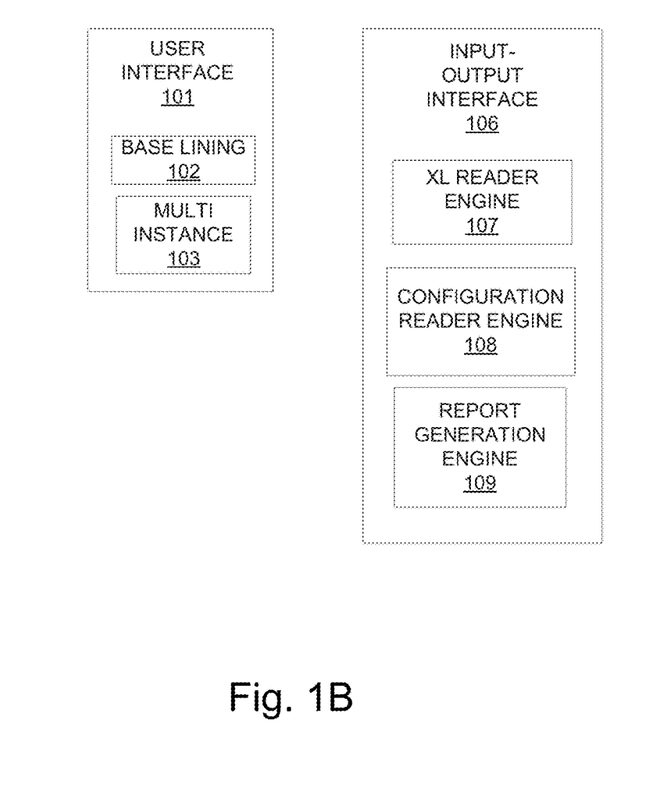
FIGS. 1B-1E illustrate further details for the components of the system, according to an embodiment.
Figure 1C:
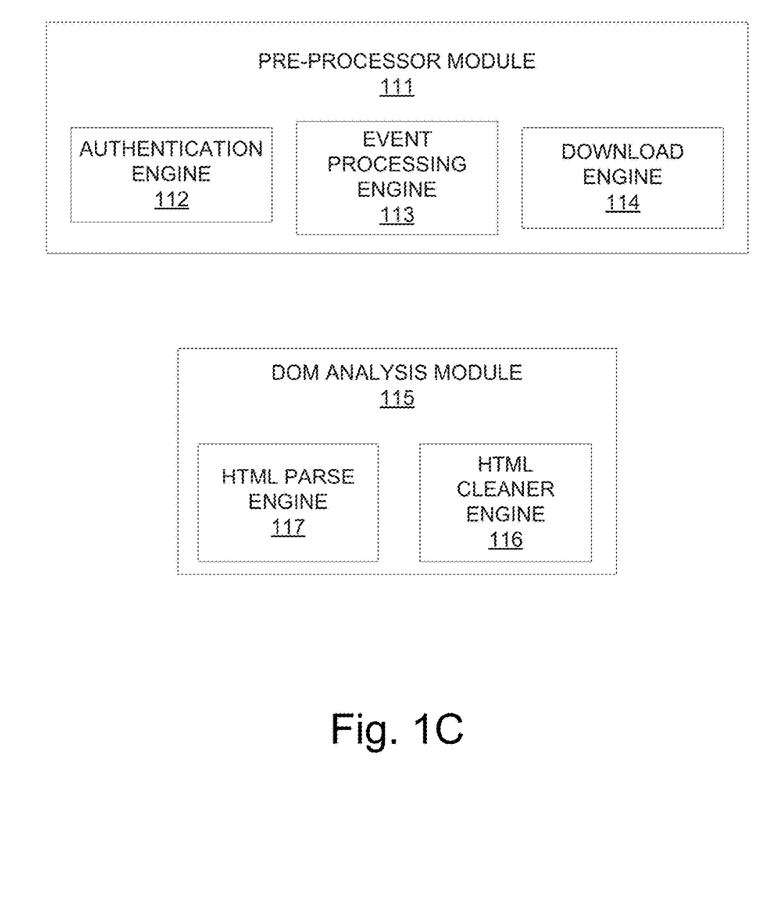
Figure 1D:
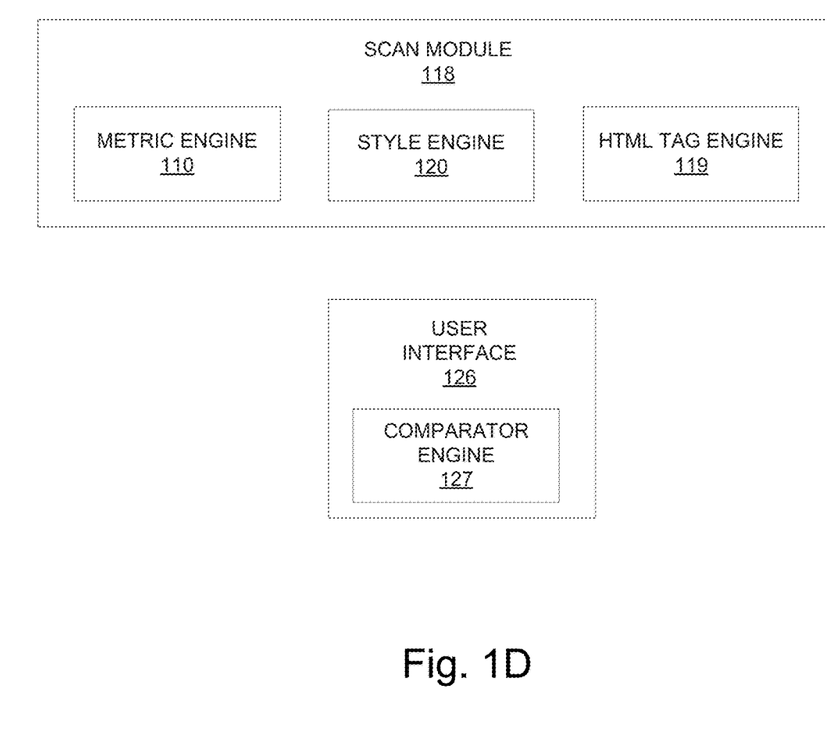
Figure 1E:
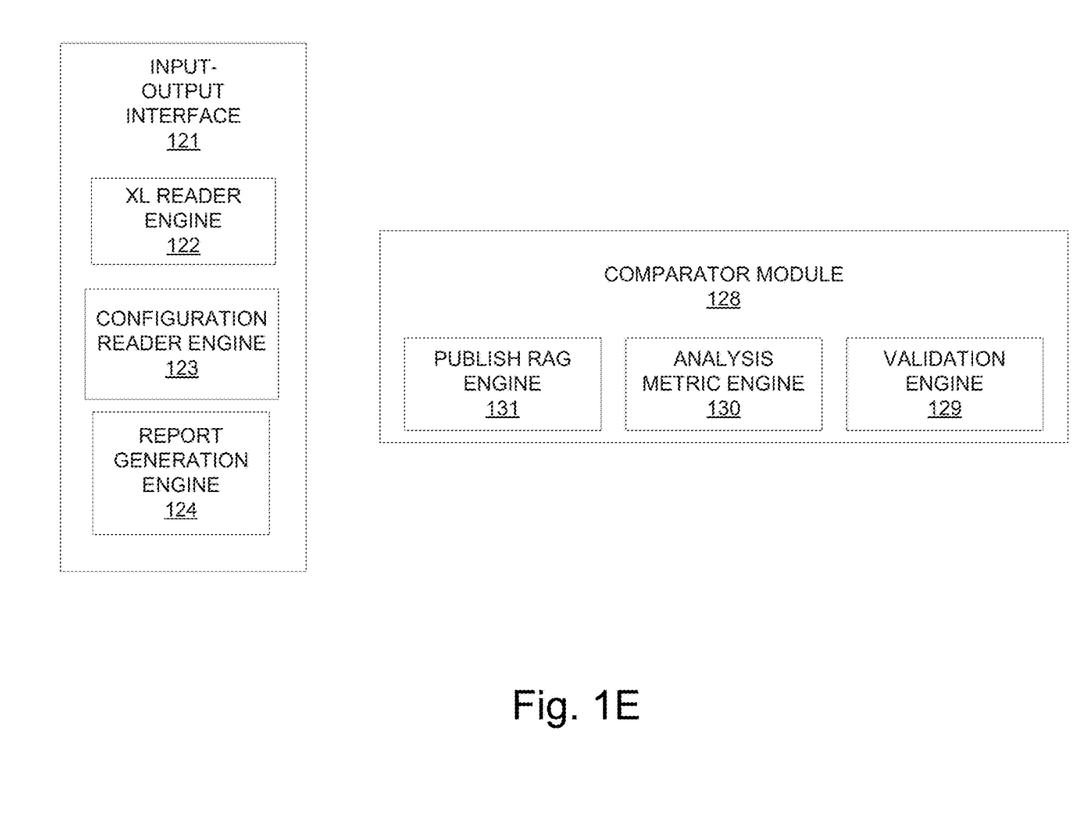
Figure 2:
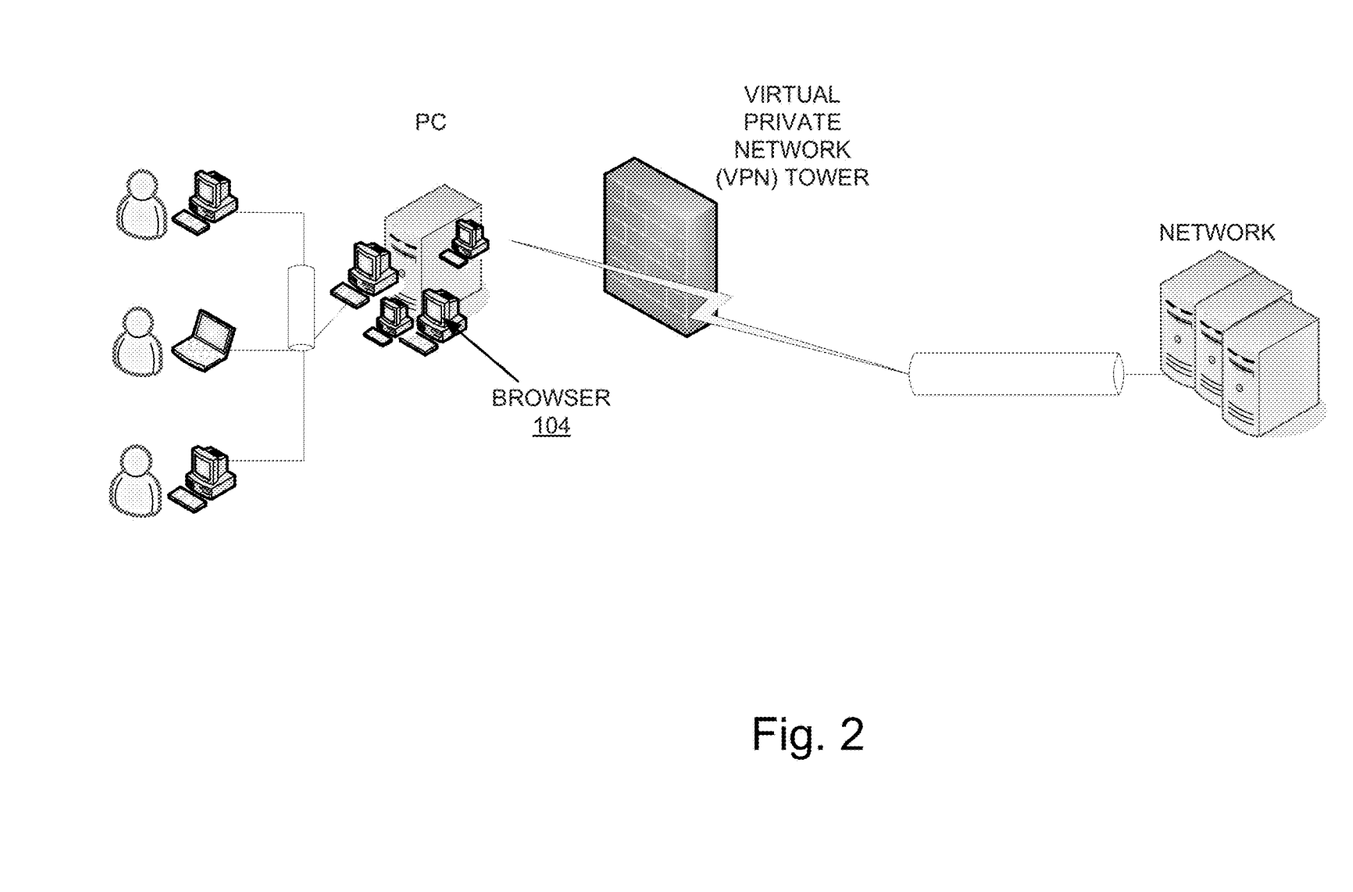
FIG. 2 illustrates an example of an environment for testing browser and OS compatibility by the browser and OS compatibility system, according to an embodiment.

FIG. 1A illustrates a browser and OS compatibility system 100, and FIGS. 1B-1E illustrate further details for the components of the system, according to an embodiment. Referring to FIGS. 1A-1E, the system 100 may include a first user interface (UI) 101 including, for example, a base lining option 102 or a multi instance option 103. The base lining option 102 may permit a user to choose a browser 104, for example via a personal computer (PC) as shown in FIG. 2, as a base line for scanning objects 105 of a website page 132 (see FIGS. 2 and 3). The multi instance option 103 may permit a user to choose other multiple browsers for scanning objects thereof. The chosen browser 104 or multiple browsers may be input to an input-output interface 106 including a XL reader engine 107 to read an input file representative of the chosen browser 104 for processing. The XL reader engine may parse spreadsheets and configuration files to provide data to downstream modules. The input-output interface 106 may further include a configuration reader engine 108 to facilitate reading of configurations, such as, for example, server locations and input file locations. The input-output interface 106 may also include a report generation engine 109 to read the output of a metric engine 110, as described in further detail below, and to generate an instance report 140 listing, for example, objects and their dimensions.

As shown in FIGS. 1A-1E, the browser compatibility system 100 may further include a pre-processor module 111 including an authentication engine 112 for secured URLs that require authentication. The authentication engine 112 may support, for example, browser level authentication or windows based authentication. An event processing engine 113 may provide, for example, navigation to different website pages and fetching of a source for a new URL. Once a URL is open, a download engine 114 may capture the HTML source file and send the captured source file to a DOM analysis module 115. The DOM analysis module 115 may include a HTML cleaner engine 116 to remove any parser invalid characters from the source file. The generated HTML file from the HTML cleaner engine 116 may be parsed by a HTML parse engine 117. The HTML parse engine 117 may further create a DOM tree of the objects 105.

Figure 3:
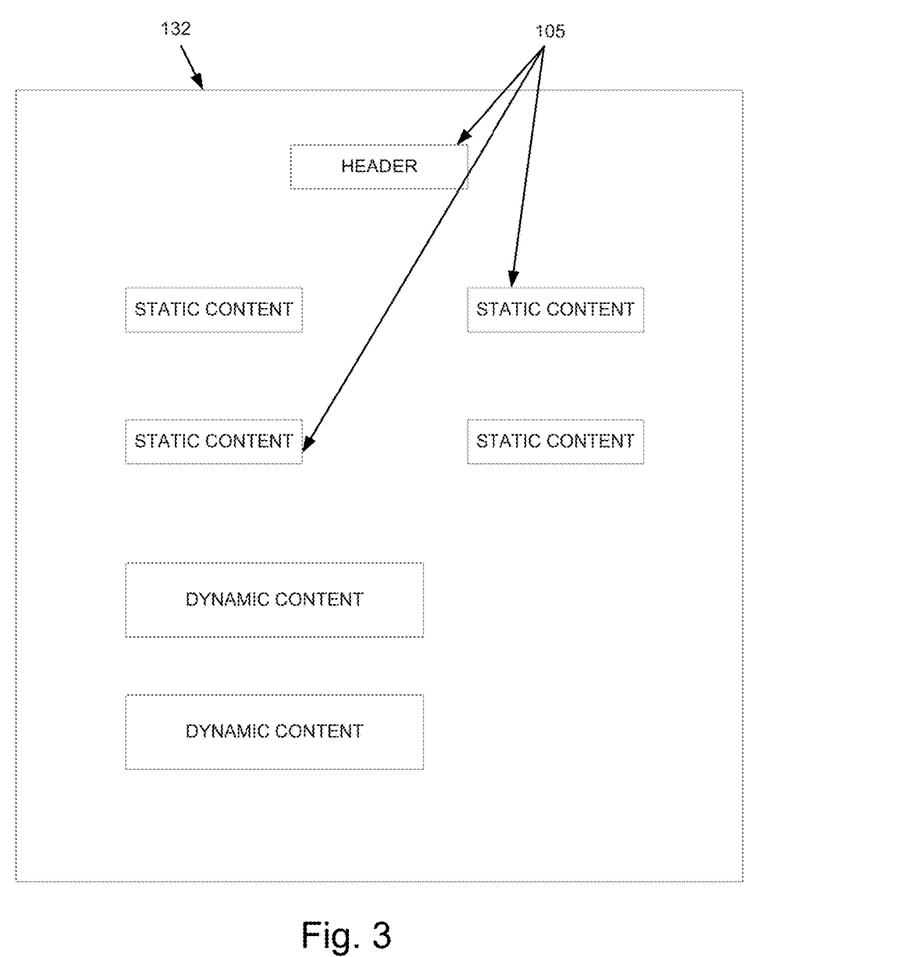
FIG. 3 illustrates an example of a website page, according to an embodiment.

Referring to FIGS. 1A-1E, a scan module 118 may receive the output of the DOM analysis module 115. The scan module 118 may include a HTML tag engine 119 which may read the DOM tree node by node and generate the objects, for example, in an EXCEL sheet. The HTML tag engine 119 may determine if there are any style tags that have display attribute values. If there are any display attribute values, a style engine 120 may be invoked. The style engine 120 may invoke appropriate display content and add the HTML source related to the display content to the existing DOM tree node to process for the metric engine 110. For example, as shown in FIG. 3, the website page 132 may include static and/or dynamic objects 105. The dynamic objects may include, for example, objects that may change content based on a user operation, such as, a mouse over. The style engine 120 may invoke the dynamic objects such that the HTML source related to the display content may be added to the existing DOM tree node to process for the metric engine 110. The style engine 120 may invoke the maximum number of dynamic objects with similar characteristics to maximize system efficiency in reading the DOM tree for attributes of each object as discussed below. For example, in a website page 132 containing 'n' dynamic objects, instead of invoking each dynamic object separately, the style engine 120 may invoke a first set of dynamic objects with common attributes (i.e., similar characteristics), and further sets of dynamic objects with common attributes to minimize the number of dynamic object sets invoked for a given website page. The style engine 120 may invoke the dynamic objects based on a predetermined set of rules for automated processing of a website page, or based on user-defined rules for a given website page.

The metric engine 110 may read the DOM tree and attributes of each object to capture the metrics of each object of a given website page. For example, the metric engine 110 may capture the absolute height, width, and x and y coordinates of an object. For an image, the size of the image may also be captured. As discussed below, the attributes, and thus the metrics, of the objects in a base website page may be compared with the same object and corresponding attributes in other website pages.

Referring to FIGS. 1A-1E, the output of the scan module 118 may be received by the input-output interface 106, which may generate the instance report 140 received by an input-output interface 121. The input-output interface 121 may include a XL reader engine 122 to read input files (base and other browser generated files) for comparison. The input-output interface 121 may further include a configuration reader engine 123 to facilitate reading of configurations, such as, for example, server locations, and input file locations. The input-output interface 121 may also include a report generation engine 124 to read EXCEL sheets and generate a compatibility report 125 for each object in the browser. The compatibility report 125 may be based on the results generated by a comparator module 128 discussed below.

Referring to FIGS. 1A-1E, a second UI 126 may include a comparator engine 127 to allow a user to choose multiple display options or outputs (e.g., reports) that may be generated for an input, for example, on different browsers, environments or machines. The output of the input-output interface 121 may be received by the comparator module 128, which may include a validation engine 129 to determine if given input files are valid for comparison. An analysis metric engine 130 may compare each object in a base website page with the same object in other website pages and analyze the difference. A publish RAG engine 131 may format the objects and their metrics. Any differences may be shown, for example, in a color (e.g., red, green) in the compatibility report 125. The publish RAG engine may process metrics information, analyze the differences in compatibility metrics and transform this analysis to a visual gauge. For example, the system 100 may include a predetermined object based threshold, or may otherwise include a user-defined threshold for objects. The threshold may also be based on the type of object. The analysis metric engine 130 may compare each object in a base website page with the same object in other website pages against the threshold. The publish RAG engine 131 may also show additional objects in different color codes.

Figure 4:
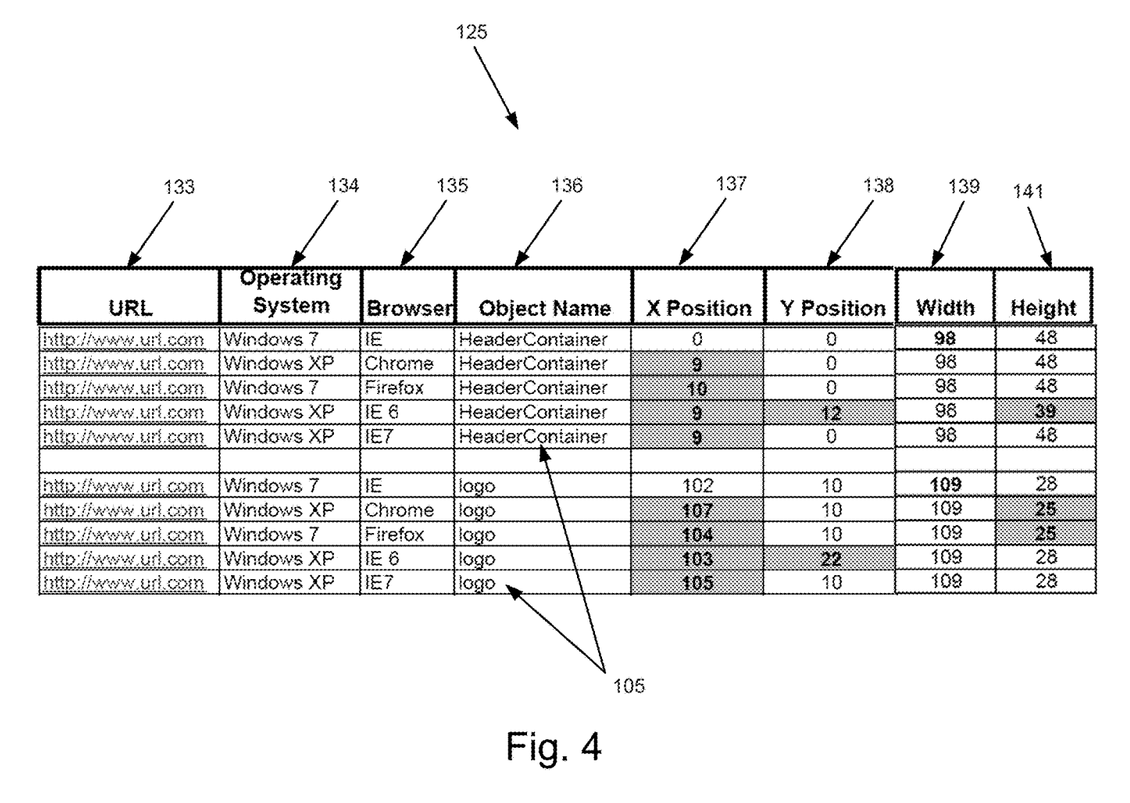
FIG. 4 illustrates an example of a compatibility report, according to an embodiment.

For example, as shown in FIG. 4, the compatibility report 125 may include a listing of a URL 133 for the website page 132, a listing of the operating system at 134, browser at 135, object name at 136, x-position at 137, y-position at 138, width at 139 and height at 141. For a threshold of 0 pixels, any deviation from the x-position, y-position, width and height of a base browser and OS combination may be highlighted. For example, referring to FIG. 4, the base browser and OS combination for INTERNET EXPLORER and WINDOWS 7 shows an object 105 (i.e., header container) having a x-position of 0 mm, a y-position of 0 mm, a width of 98 mm and height 48 mm. The corresponding object for the browser and OS combination for GOOGLE CHROME and WINDOWS XP shows the same object 105 (i.e., header container) having a x-position of 9 mm, a y-position of 0 mm, a width of 98 mm and height 48 mm. Hence the compatibility report 125 may highlight the deviation in the x-position, for example, in a red color, with the remaining identical metrics remaining un-highlighted. Further, any increasing or decreasing deviations may be highlighted in different colors. In this manner, the compatibility report 125 may include a listing of all static and dynamic objects 105 of the website page 132, and any deviation of the objects 105 from the base browser and OS combination. The compatibility report 125 may also list an overall percentage similarity of a particular browser and OS combination from the base browser and OS combination (e.g., 98% similarity).

Figure 5:
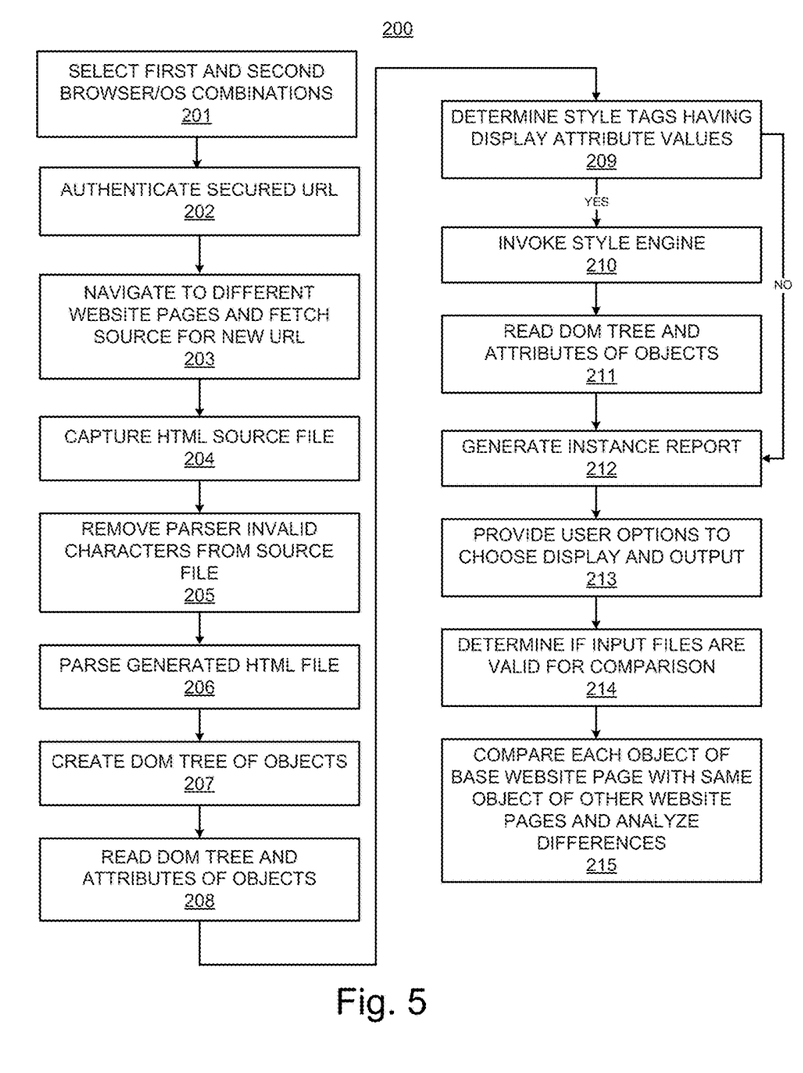
FIG. 5 illustrates a method for browser and OS compatibility testing, according to an embodiment.

FIG. 5 illustrates a flowchart of a method 200 for browser and OS compatibility testing, according to an embodiment. The method 200 may be implemented on the browser and OS compatibility system described above with reference to FIGS. 1A-4 by way of example and not limitation. The method 200 may be practiced in other systems.

Referring to FIGS. 1A-1E, 3 and 5, at block 201, the method may include selecting a first combination of a browser and an OS for comparison to a second combination of a browser and an OS. The browser and/or the OS for the first combination may be different from the browser and/or the OS for the second combination. For example, referring to FIGS. 1A-1E, the first UI 101 may include, for example, the base lining option 102 or the multi instance option 103. The base lining option 102 may permit a user to choose the browser 104 as a base line for scanning the objects 105 of the website page 132. The multi instance option 103 may permit a user to choose other multiple browsers for scanning objects thereof. The chosen browser 104 or multiple browsers may be input to the input-output interface 106 including the XL reader engine 107 to read an input file representative of the chosen browser 104 for processing. The input-output interface 106 may further include the configuration reader engine 108 to facilitate reading of configurations, such as, for example, server locations and input file locations.

At block 202, the method may include authentication of secured URLs. For example, referring to FIGS. 1A-1E, the browser compatibility system 100 may include the pre-processor module 111 including the authentication engine 112 for secured URLs that require authentication. The authentication engine 112 may support, for example, browser level authentication or windows based authentication.

At block 203, the method may include navigation to different website pages and fetching a source for a new URL. For example, referring to FIGS. 1A-1E, the event processing engine 113 may provide, for example, navigation to different website pages and fetching a source for a new URL.

At block 204, the method may include capture of the HTML source file and sending the captured source file to the DOM analysis module 115. For example, referring to FIGS. 1A-1E, once a URL is open, the download engine 114 may capture the HTML source file and send the captured source file to the DOM analysis module 115.

At block 205, the method may include removal of any parser invalid characters from the source file. For example, referring to FIGS. 1A-1E, the DOM analysis module 115 may include the HTML cleaner engine 116 to remove any parser invalid characters from the source file.

At block 206, the method may include parsing of the generated HTML file from the HTML cleaner engine 116. For example, referring to FIGS. 1A-1E, the generated HTML file from the HTML cleaner engine 116 may be parsed by the HTML parse engine 117.

At block 207, the method may include creating a DOM tree of the objects 105. For example, referring to FIGS. 1A-1E, the HTML parse engine 117 may further create a DOM tree of the objects 105.

At block 208, the method may include reading the DOM tree node by node and attributes of objects, and generating the objects, for example, in an EXCEL sheet. For example, referring to FIGS. 1A-1E, the scan module 118 may receive the output of the DOM analysis module 115. The scan module 118 may include the HTML tag engine 119 which may read the DOM tree node by node and generate the objects, for example, in an EXCEL sheet.

At block 209, the method may include determining if there are any style tags that have display attribute values. For example, referring to FIGS. 1A-1E, the HTML tag engine 119 may determine if there are any style tags that have display attribute values. If there are style tags that have display attribute values, the method may proceed to block 210, and otherwise, the method may proceed to block 212.

At block 210, the method may include invoking the style engine if there are any display attribute values. For example, referring to FIGS. 1A-1E, if there are any display attribute values, a style engine 120 may be invoked. The style engine 120 may invoke appropriate display content and add the HTML source related to the display content to the existing DOM tree node to process for the metric engine 110. For example, as shown in FIG. 3, the website page 132 may include static and/or dynamic objects 105. The dynamic objects may include, for example, objects that may change content based on a user operation, such as, a mouse over. The style engine 120 may invoke the dynamic objects such that the HTML source related to the display content may be added to the existing DOM tree node to process for the metric engine 110. The style engine 120 may invoke the maximum number of dynamic objects to maximize system efficiency in reading the DOM tree for attributes of each object as discussed below. For example, in a website page 132 containing 'n' dynamic objects, instead of invoking each dynamic object separately, the style engine 120 may invoke a first set of dynamic objects with common attributes (i.e., similar characteristics), and further sets of dynamic objects with common attributes to minimize the number of dynamic object sets invoked for a given website page. The style engine 120 may invoke the dynamic objects based on a predetermined set of rules for automated processing of a website page, or based on user-defined rules for a given website page.

At block 211, the method may include reading the DOM tree and attributes of each object to capture the metrics of each object of a given website page. For example, referring to FIGS. 1A-1E, the metric engine 110 may read the DOM tree and attributes of each object to capture the metrics of each object of a given website page. For example, the metric engine 110 may capture the absolute height, width, and x and y coordinates of an object. For an image, the size of the image may also be captured. The attributes of the objects in a base website page may be compared with the same object and corresponding attributes in other website pages.

At block 212, the method may include generating an instance report received by the input-output interface 121. The instance report may list, for example, objects and their dimensions. For example, referring to FIGS. 1A-1E, the output of the scan module 118 may be received by the input-output interface 106, which may generate the instance report 140 received by the input-output interface 121. The input-output interface 106 may include the report generation engine 109 to read the output of the metric engine 110, and to generate the instance report. The input-output interface 121 may include the XL reader engine 122 to read input files (base and other browser generated files) for comparison. The input-output interface 121 may further include the configuration reader engine 123 to facilitate reading of configurations, such as, for example, server locations, and input file locations. The input-output interface 121 may also include the report generation engine 124 to read multiple EXCEL sheets and generate a compatibility report 125 for each object in the browser. The compatibility report 125 may be based on the results generated by the comparator module 128.

At block 213, the method may include allowing a user to choose multiple display options or outputs. For example, referring to FIGS. 1A-1E, the second UI 126 may include the comparator engine 127 to allow a user to choose multiple display options or outputs (e.g., reports) that may be generated for an input, for example, on different browsers, environments or machines.

At block 214, the method may include determining if given input files are valid for comparison. For example, referring to FIGS. 1A-1E, the output of the input-output interface 121 may be received by the comparator module 128, which may include the validation engine 129 to determine if given input files are valid for comparison.

At block 215, the method may include comparing each object of a base website page with the same object of other website pages and analyzing the difference. For example, referring to FIGS. 1A-1E, the analysis metric engine 130 may compare each object, and thus the metrics of each object, in a base website page with the same object in other website pages and analyze the difference. The publish RAG engine 131 may format the objects and their metrics. Any differences may be shown, for example, in a color (e.g., red) in the compatibility report 125. For example, the system 100 may include a predetermined object based threshold, or may otherwise include a user-defined threshold for objects. The threshold may also be based on the type of object. The analysis metric engine 130 may compare each object in a base website page with the same object in other website pages against the threshold. The publish RAG engine 131 may also show additional objects in different color codes.

Figure 6:
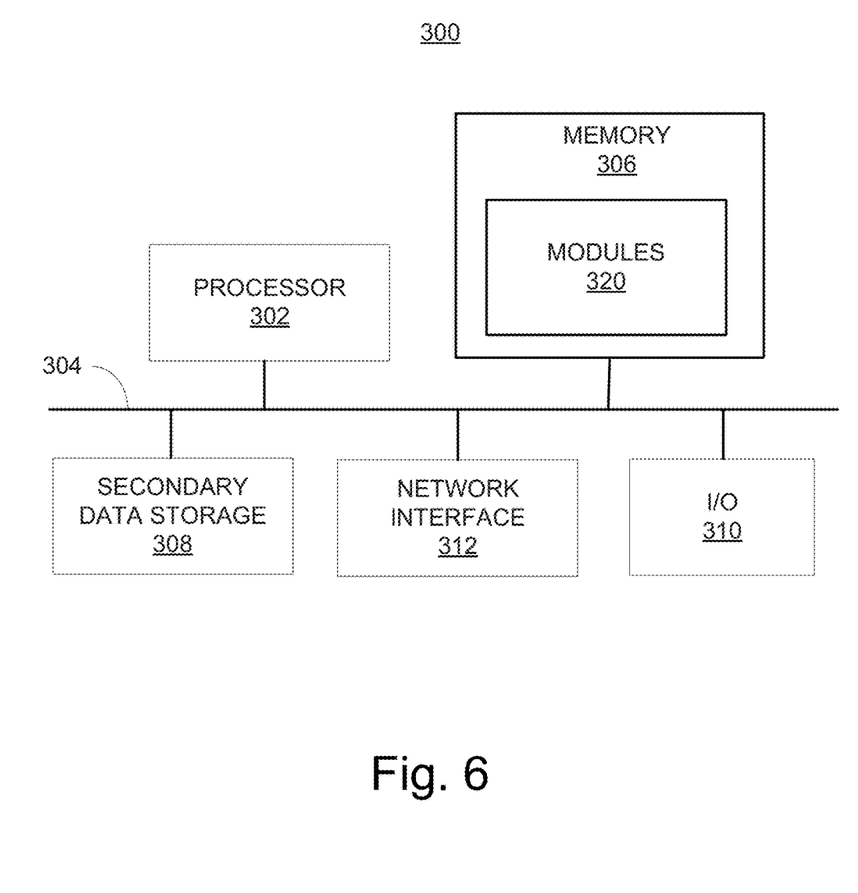
FIG. 6 illustrates a computer system, according to an embodiment.

FIG. 6 shows a computer system 300 that may be used with the embodiments described herein. The computer system 300 represents a generic platform that includes components that may be in a server or another computer system. The computer system 300 may be used as a platform for the system 100. The computer system 300 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 300 includes a processor 302 that may implement or execute machine readable instructions performing some or all of the methods, functions and other processes described herein. Commands and data from the processor 302 are communicated over a communication bus 304. The computer system 300 also includes a main memory 306, such as a random access memory (RAM), where the machine readable instructions and data for the processor 302 may reside during runtime, and a secondary data storage 308, which may be non-volatile and stores machine readable instructions and data. The memory and data storage are examples of computer readable mediums. The memory 306 may include modules 320 including machine readable instructions residing in the memory 306 during runtime and executed by the processor 302. The modules 320 may include the modules 111, 115, 118 and 128 and the respective engines thereof of the system 100 shown in FIGS. 1A-1E.

The computer system 300 may include an I/O device 310, such as a keyboard, a mouse, a display, etc. The computer system 300 may include a network interface 312 for connecting to a network. Other known electronic components may be added or substituted in the computer system 300.

While the embodiments have been described with reference to examples, various modifications to the described embodiments may be made without departing from the scope of the claimed embodiments.

What is claimed is:

1. A browser and operating system (OS) compatibility system comprising:
    a user interface to receive selection of a first combination of a browser and an OS for comparison to a second combination of a browser and an OS, wherein at least one of the browser or the OS in the first combination is different from at least one of the browser or the OS in the second combination;
    a parse engine to generate a model of objects in first and second website pages respectively for the browsers in the first and second combinations;
    a metric engine to analyze the generated model for attributes of the objects in the first and second website pages to capture metrics of the objects in the first and second website pages;
    an analysis metric engine, executed by a processor, to compare a metric of an object, from the objects, of the first website page to a metric of a same object, from the objects, of the second website page to determine a compatibility of the browser and the OS in the first combination to the browser and the OS in the second combination; and
    a style engine to invoke a maximum number of dynamic objects that include changeable content, from the objects, with similar characteristics by dividing the dynamic objects into sets of the dynamic objects that include similar characteristics to minimize a number of the sets of the dynamic objects that are invoked.

2. The browser and OS compatibility system of claim 1, wherein the user interface includes
    a base lining option for selection of single first and second browsers, and
    a multi instance option for selection of multiple first and second browsers.

3. The browser and OS compatibility system of claim 1, wherein the metrics of the objects include an absolute location of an object in a website page.

4. The browser and OS compatibility system of claim 1, wherein the metrics of the objects include a size of an object in a website page.

5. The browser and OS compatibility system of claim 1, further comprising:
    a download engine to capture source files for the browsers in the first and second combinations, wherein the source files include HTML source files.

6. The browser and OS compatibility system of claim 1, further comprising:
    a download engine to capture source files for the browsers in the first and second combinations; and
    an HTML cleaner engine to remove parser invalid characters from the source files.

7. The browser and OS compatibility system of claim 1, further comprising:
    a report generation engine to
        determine a deviation of the metric of the object in the first website page from the metric of the same object in the second website page, and
        generate a compatibility report for the objects in the first and second website pages including an indication of the deviation of the metric of the object in the first website page from the metric of the same object in the second website page.

8. The browser and OS compatibility system of claim 7, wherein the report generation engine is to generate a color coded indication related to a level of the deviation.

9. The browser and OS compatibility system of claim 7, wherein the indication is based on the deviation exceeding a predetermined threshold.

10. The browser and OS compatibility system of claim 9, wherein the predetermined threshold is based on an object type.

11. The browser and OS compatibility system of claim 7, wherein the indication is based on the deviation exceeding a user-defined threshold.

12. The browser and OS compatibility system of claim 1, wherein the object includes at least one of a graphic, text, or a drop down menu.

13. The browser and OS compatibility system of claim 1, further comprising:
a report generation engine to
determine a similarity of the browser and the OS in the first combination to the browser and the OS in the second combination, and
generate a compatibility report for the objects in the first and second website pages including an indication of the similarity of the browser and the OS in the first combination to the browser and the OS in the second combination.

14. A method for browser and operating system (OS) compatibility testing, the method comprising:
selecting an application that is usable with a first combination of a browser and an OS in compatibility testing with a second combination of a browser and an OS, wherein at least one of the browser or the OS in the first combination is different from at least one of the browser or the OS in the second combination;
creating Document Object Model (DOM) trees of objects in the application for first and second website pages respectively for the browsers in the first and second combinations;
analyzing the DOM trees for attributes of the objects in the application for the first and second website pages to capture metrics of the objects in the application for the first and second website pages;
comparing, by a processor, a metric of an object, from the objects, of the first website page to a metric of a same object, from the objects, of the second website page to determine whether the application is compatible with the browser and the OS in the second combination; and invoking a maximum number of dynamic objects, from the objects, with similar characteristics by dividing the dynamic objects into sets of the dynamic objects that include similar characteristics to minimize a number of the sets of the dynamic objects that are invoked.

15. The method of claim 14, wherein the metrics of the objects include an absolute location of an object in a website page.

16. The method of claim 14, wherein the metrics of the objects include a size of an object in a website page.

17. The method of claim 14, further comprising:
capturing source files for the browsers in the first and second combinations, wherein the source files include HTML source files.

18. The method of claim 14, further comprising:
determining a deviation of the metric of the object in the first website page from the metric of the same object in the second website page; and
generating a compatibility report for the objects in the first and second website pages including an indication of the deviation of the metric of the object in the first website page from the metric of the same object in the second website page.

19. The method of claim 18, wherein the indication is based on the deviation exceeding a predetermined threshold.

20. A non-transitory computer readable medium having stored thereon a computer executable program for browser and operating system (OS) compatibility testing, the computer executable program when executed causes a computer system to:
select a first combination of a first browser and a first OS for comparison to a second combination of a second browser and a second OS, wherein the first browser and the first OS in the first combination are different from the second browser and the second OS in the second combination;
ascertain alignment of objects in first and second website pages respectively for the browsers in the first and second combinations;
analyze the alignment of the objects to capture metrics of the objects in the first and second website pages; and
compare, by a processor, a metric of an object, from the objects, in the first website page to a metric of a same object, from the objects, in the second website page to determine a compatibility of the first browser and the first OS in the first combination to the second browser and the second OS in the second combination.

* * * * *